April 18, 1933.  M. W. SEVERANCE  1,904,988
BATTERY HANDLE
Filed Feb. 21, 1930
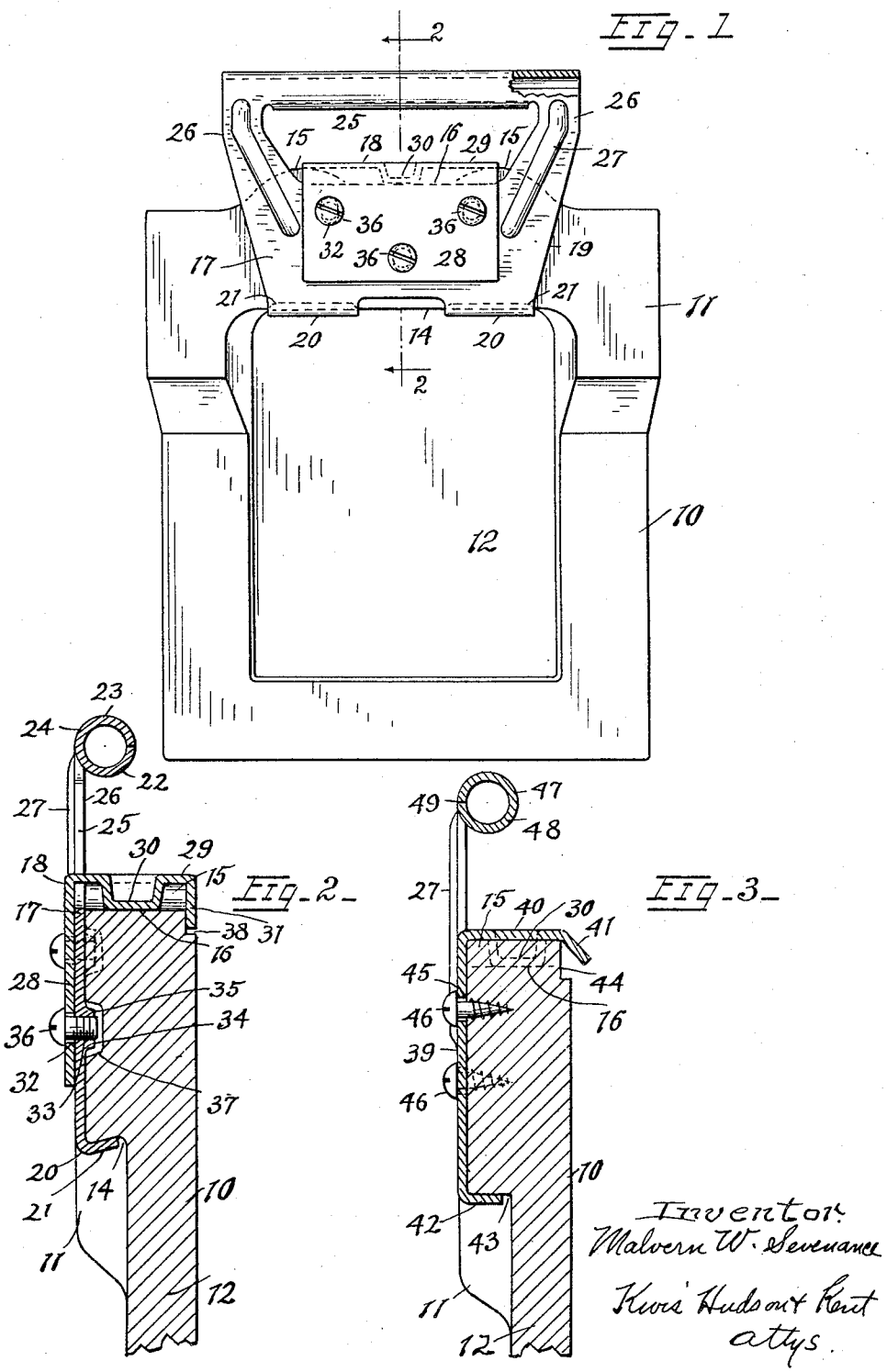
Inventor:
Malvern W. Severance
Kwis Hudson & Kent
attys.

Patented Apr. 18, 1933

1,904,988

UNITED STATES PATENT OFFICE

MALVERN W. SEVERANCE, OF CLEVELAND, OHIO, ASSIGNOR TO WILLARD STORAGE BATTERY COMPANY, OF CLEVELAND, OHIO, A CORPORATION OF WEST VIRGINIA

BATTERY HANDLE

Application filed February 21, 1930. Serial No. 430,149.

This invention relates to handles for the containers of electric storage batteries and while it is of general utility for this purpose, it relates more particularly to metal devices of this character adapted to be attached to containers for larger sizes of batteries, such as are used in motor trucks, busses, and the like.

It is an object of the invention to provide a handle which may be very quickly and simply attached to storage battery containers.

Another object is to provide a handle of the character described which will place the holddown strain directly on top of the container wall.

A further object is to simplify and improve the construction and operation of devices of this character.

Other objects and features of novelty will be apparent as the following description proceeds, as taken in conjunction with the accompanying drawing, in which:

Fig. 1 is an end elevation of a battery container, showing the handle according to the present invention as secured thereto;

Fig. 2 is a vertical cross section taken along the line 2—2 of Fig. 1;

Fig. 3 is a view similar to Fig. 2 but showing a modified form of the device.

Referring more particularly to the drawing, in connection with the following detail description of a device according to one embodiment of the invention, there is illustrated a battery container, indicated generally at 10, comprising a box-like structure of molded plastic material such as rubber, asphalt, and the like, or compositions of the same. In molding this container, a reenforcing marginal portion 11 is provided at the upper portion of the end wall 12. The lower edge of the portion 11 is recessed as at 14 to form a shoulder or handhold which may be undercut, as shown. The upper edge of the portion 11 projects above the normal top plane of the container, forming a stub handle consisting of humps or protuberances 15, between which is formed a depression 16, the purpose of which is primarily to receive the holddown and provide clearance for the same, but which may also serve to receive the thumb of a workman, while his finger tips engage the handhold 14. The grip afforded by the handhold 14 and the depression 16 is ordinarily sufficient to enable the workman to support the weight of batteries of the smaller sizes.

However, many batteries, such as those used in motor trucks, busses, and various other installations, are of such size and consequent weight that the stub handle arrangement described above as providing a finger tip hold on the container, is not sufficient, as it throws a severe strain upon the finger muscles, if it is not entirely inadequate to support the weight. A handle must be provided which will permit the workman to grip the handle in such a manner as to bring into play the stronger muscles of the hands.

It is to this purpose that the present invention is directed, the structure of the battery container described above forming no part of the present invention other than in combination with the structure now to be described. While the new handle is adapted to be applied to a container having this stub handle construction, it is obviously also adapted to other types and sizes of containers.

The preferred handle structure shown in Figs. 1 and 2, comprises a main handle member 17 and a securing member 18, the two being secured together to form the complete handle, and to attach the same to the battery container. Both members are preferably formed of sheet metal for simplicity and speed of construction, and the resultant economy. The member 17 is formed from a substantially rectangular blank, the side portions of which are tapered inwardly toward the bottom as at 19, terminating in spaced tongues 20 which are bent laterally and slightly upwardly as at 21 so as to engage the handhold 14 as shown in Fig. 2. The taper of the sides permits the top or handle-grip portion to be wider than the handhold engaging portion so as to allow adequate space for the hand. To form the hand-grip, a tongue 22 is struck up from the central portion of the member 17 and rolled into a semitubular form. The top marginal portion of the member 17 is reversely rolled as at 23 so as to meet the tongue 22, the two forming a tubular hand-grip 24. Striking up the tongue 22 leaves an aperture 25 to permit passage of the fingers in gripping the tube 24, and this aperture may be enlarged if desired to provide adequate clearance. This construction forms arms 26 extending upwardly from the body portion of the member 17 to the hand-grip 24, and these arms are preferably corrugated as at 27, for strengthening purposes.

The member 18 comprises a body portion 28 and a lateral extension 29. The extension 29 has a depression 30 formed therein, and a depending flange 31 at the inner edge thereof. When assembled as shown in Fig. 2, the body portion 28 is adapted to overlie the body portion of the main handle member 17, and the lateral extension 29 projects through the aperture 25 so as to overlie the stub handle, the depression 30 extending into the depression 16 of the stub handle, and the flange 31 overlying the inner edge of the stub handle.

In mounting the handle on the container, the member 17 is placed against the end wall of the battery box, with the tongues 21 engaging the handhold 14. The member 18 is then applied, with its body portion 28 overlying the body portion of the member 17 and the extension 29 projecting through the aperture 25 and engaging the top of the stub handle. The body portion 28 is provided with a plurality of holes 32, and the body portion of the main member 17 is provided with threaded holes 33. The two parts may then be secured to each other in position, thus securing the handle to the container. The holes 32 should be slightly elongated in order to allow for adjustment to suit inequalities in various stub handles. The metal about the holes 33 is preferably extruded, forming inwardly projecting bosses 34, and the holes are tapped as at 35 to receive machine screws 36 extending inwardly through the aligned apertures 32 of the body portion 28. With this arrangement, the extruding of the holes in effect thickens the material of the member 17 so as to afford sufficient purchase for the threads of the machine screws and thus render it unnecessary to puncture and consequently mar the material of the battery container. The end wall which is engaged by the portion 28 is preferably molded with recesses 37 to receive the bosses 34, and a groove 38 to receive the flange 31. When mounted as above described, holddown strains applied to the tubular hand-grip or to the depression 30 will be transmitted directly to the container wall.

A modified construction is illustrated in Fig. 3, in which the entire battery handle comprises a single integral sheet metal member. In this construction, the lower portion 39 is adapted to engage the end wall, and a tongue 40 is struck up from the metal above the attaching portion 39 and extends laterally to form the abutment for transmitting the holddown strains directly to the top of the container wall. The portion 40 thus comprises a flange engaging the top of the stub handle, and may be provided with the depression 30 which engages the depression 16 in the top of the stub handle in the manner described in connection with Fig. 2. The outer portion of the flange 40 is bent downwardly at an angle of about 45° as at 41. The lower portion of the handle is provided with tongues 42 which are bent inwardly to underlie the handhold or shoulder 43 which, as shown in this figure, is not undercut.

Inasmuch as the modified construction is all one piece, the handle may be applied by first inserting the tongues 42 in the handhold 43 and then pivoting the handle about this portion until the parts reach the position shown in Fig. 3, after which the flange 41 may be bent down into the groove 44 formed in the inner edge of the container, by means of a tool such as a pair of tongs. However, it is also within the purview of the invention to bend down the portion 41 at about 90° and form the entire handle of resilient material which will permit the portions 41 or 42 to be snapped into place. The portion 39 is provided with holes 45 adapted to receive wood screws 46 which extend into the material of the container end wall.

The flange 40 utilizes the greater part of the material struck up from the handle blank, and hence to form the hand-grip, material thereabove must be utilized. For this purpose a wider strip of material 47 is rolled down from the top portion of the blank to form a tubular hand-grip 48, the top edge of the portion 47 being brought around to engage the top of the opening formed in the construction of the flange 40. This causes a joint 49, which occurs at the opposite side of the tubular handle from the position in which it is formed in the modification shown in Fig. 2. The arms 17 and reenforcing portions 27 are identical with those described, and hence will not be again described in detail.

To protect the stronger, but more corrosive material of the handle, which is preferably of sheet iron or steel, the same may be covered with a lead coating which extends over all exposed portions thereof. Further protection is afforded by a coating of lacquer or other desired finish coating.

From the foregoing description it is readily apparent that the battery handle, according to the present invention, is simple and economical in construction and attachment to the battery container, is of adequate strength, and otherwise well adapted for the purposes set forth, inasmuch as it may be readily applied to battery containers as described now on the market, in any service station, necessitating only a screw driver for the entire operation, and when mounted will transmit the holddown strain directly to the top of the container wall.

While several embodiments of the invention have been illustrated and described in considerable detail so as to enable any one skilled in the art to practice the invention, nevertheless the invention is not to be limited to any of the details disclosed, other than as necessitated by the development of the prior art, and therefore includes such embodiments of the broad idea as fall within the scope of the appended claims.

Having thus described my invention, I claim:

1. In combination with a storage battery box having a shoulder and recesses in the end walls thereof, a handle comprising a member having a hand grip and a vertical portion engaging the end wall of the battery box and terminating in a hooked extremity adapted to engage the shoulder in the end wall, and a second member extending through an opening in the first named member and having a top portion adapted to hook over the top of the said end wall, and a vertical portion extending down along the outer surface of the vertical portion of the first named member in contact therewith, and fastening means located opposite said recesses and extending through the vertical portions of said members for securing said members together.

2. In combination with a storage battery box having a pair of spaced protuberances on each upper end wall, a sheet metal handle adapted to be detachably secured to one of said end walls, comprising a sheet metal member extending across the end wall above said protuberances and having a flange engaging the inner faces of said protuberances, said sheet metal member having a depression located between the protuberances extending downwardly far enough to bear upon the end wall and adapted to receive the upper extremity of a hold-down member and transmit pressure therefrom directly to said end wall.

In testimony whereof, I hereunto affix my signature.

MALVERN W. SEVERANCE.